US006798345B2

(12) United States Patent
Satoh

(10) Patent No.: US 6,798,345 B2
(45) Date of Patent: Sep. 28, 2004

(54) ADMINISTRATIVE SYSTEM

(75) Inventor: Kazuhiko Satoh, Tokyo (JP)

(73) Assignee: Allied Telesis K.K., Tokyo (JP)

(*) Notice: Subject to any disclaimer, the term of this patent is extended or adjusted under 35 U.S.C. 154(b) by 4 days.

(21) Appl. No.: 09/991,644

(22) Filed: Nov. 26, 2001

(65) Prior Publication Data

US 2003/0048188 A1 Mar. 13, 2003

(30) Foreign Application Priority Data

Sep. 13, 2001 (JP) ......................................... 2001-278614

(51) Int. Cl.$^7$ .......................................... G08B 23/00
(52) U.S. Cl. ................ 340/573.1; 340/542; 340/825.36; 340/825.52; 340/825.49
(58) Field of Search ............................. 340/573.1, 542, 340/545.1, 506, 572.9, 586, 825.36, 825.52, 825.49

(56) References Cited

U.S. PATENT DOCUMENTS

| 3,673,331 | A | * | 6/1972 | Hair et al. ................... 704/203 |
| 3,781,845 | A | * | 12/1973 | Ellul ........................... 340/306 |
| 3,866,173 | A | * | 2/1975 | Moorman et al. .......... 340/5.54 |
| 5,023,901 | A | * | 6/1991 | Sloan et al. ................. 340/505 |
| 5,051,741 | A | * | 9/1991 | Wesby .......................... 340/539 |
| 5,298,725 | A | * | 3/1994 | Fischer ........................ 235/375 |
| 5,465,082 | A | * | 11/1995 | Chaco .......................... 235/382 |
| 5,541,583 | A | * | 7/1996 | Mandelbaum ............... 235/382 |
| 5,572,192 | A | * | 11/1996 | Berube ......................... 340/306 |
| 5,610,596 | A | * | 3/1997 | Petitclerc ..................... 235/383 |
| 5,623,258 | A | * | 4/1997 | Dorfman ...................... 235/382 |
| 5,748,085 | A | * | 5/1998 | Davis et al. ................. 340/539 |
| 5,886,634 | A | * | 3/1999 | Muhme .................... 340/572.1 |
| 6,164,532 | A | * | 12/2000 | Suga et al. .................. 235/380 |

FOREIGN PATENT DOCUMENTS

| GB | 2031249 A | * | 4/1980 |
| JP | 2-121099 | | 5/1990 |
| JP | 4-112300 | | 4/1992 |
| JP | 9-147276 | | 6/1997 |
| JP | 2000-172970 | | 6/2000 |
| JP | 2000-207451 | * | 7/2000 |

* cited by examiner

Primary Examiner—Daniel J. Wu
Assistant Examiner—Son Tang
(74) Attorney, Agent, or Firm—Oblon, Spivak, McClelland, Maier & Neustadt, P.C.

(57) ABSTRACT

An administrative system provided with surveillance equipment, which is arranged in a plurality of locations on a patrol surveillance route, for (1) reading identification information stored in an information storage medium carried by surveillance staff, and (2) transmitting the identification information. The system is also provided with management devices for (1) receiving the identification information transmitted by the surveillance equipment and (2) storing the identification information in relation to identification information that identifies the surveillance equipment.

20 Claims, 16 Drawing Sheets

CARD ID: KANSHI 1

| TIME INFORMATION | TRANSMISSION | ALERT BUTTON | RELATIONAL DATA FILE |
|---|---|---|---|
| 2001.10.15 23:20:15 | BOX-a | OFF | — |
| 2001.10.15 23:26:40 | BOX-b | OFF | VOICE1. WAV |
| 2001.10.15 23:35:08 | BOX-c | OFF | — |
| ⋮ | ⋮ | ⋮ | ⋮ |
| 2001.11.08 20:12:36 | NET-c | OFF | — |
| 2001.11.08 20:18:05 | NET-d | ON | VOICE2. WAV |

*FIG. 5*

| REGION | 101 | 102 | 103 | 104 |
|---|---|---|---|---|
| MAC ADDRESS | 00-11-22-33-44-55 | 00-11-22-33-44-66 | 00-11-22-33-55-66 | 00-22-33-44-55-66 |
| IP ADDRESS | 192.1681.1 | 192.1681.2 | 192.1681.3 | 192.1681.4 |
| USER ID | USER1 | USER2 | USER3 | USER4 |
| PASSWORD | ****** | ****** | ****** | ****** |

*FIG. 7*

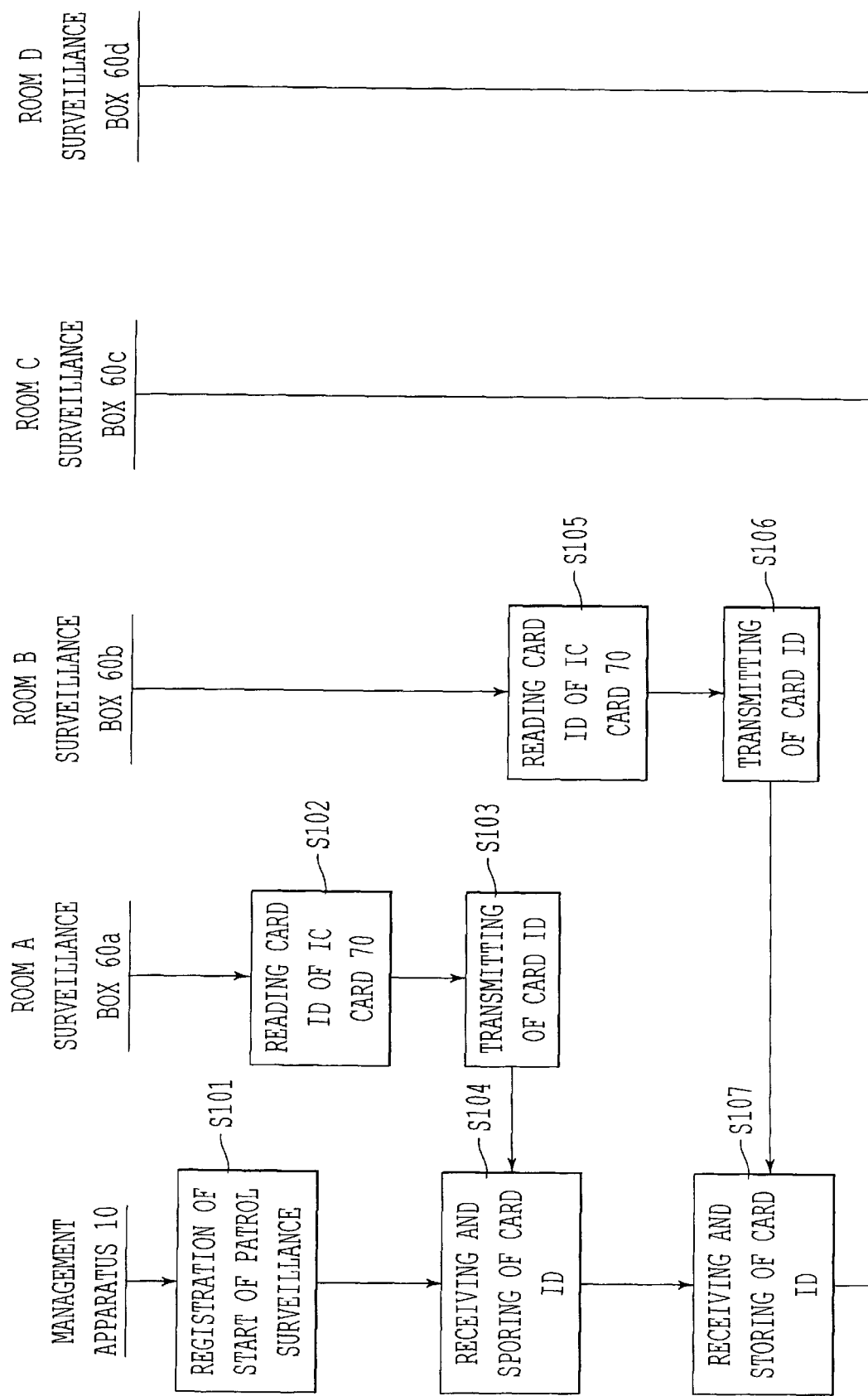

ADMINISTRATIVE SYSTEM

BACKGROUND OF THE INVENTION

1. Field of the Invention

The present invention relates to an administrative system for surveillance by surveillance staff, and to a management apparatus, interconnecting device, terminal device and surveillance method for application of this administrative system.

2. Description of the Related Art

As a result of the widespread use of LANs and WANs (Wide Area Networks) in recent years, information sharing and the transmission of information are frequently performed through the connection of multiple network devices, such as personal computers (termed "PCs" hereinbelow), hubs, switches, and routers, to networks and subnets. For example, administrative systems for surveillance inside buildings and factories may also be implemented by employing such network devices. Infrared sensors and cameras, or similar, are provided in rooms and corridors to detect the presence of intruders.

However, in cases where the use of an administrative system alone is judged to be unsatisfactory and where an administrative system is not provided, surveillance is typically carried out by surveillance staff. When surveillance is carried out by surveillance staff, cases of so-called patrol surveillance, in which surveillance staff patrol locations to be inspected in sequence, are common. In such cases, it is typically the responsibility of surveillance staff to complete a predetermined form, which is to be verified by a manager, to say whether or not a prescribed patrol route has been followed and whether or not surveillance and inspection thereof has been performed.

However, confirmation through the use of a form alone does not make it possible to confirm whether or not surveillance staff have been to the locations for surveillance. Since management of surveillance staff is therefore insufficient, and situations may also arise where surveillance staff do not carry out the prescribed surveillance, there is a high probability that events of disastrous consequences will result.

A problem therefore exists with conventional administrative systems in that it is impossible to provide support for surveillance carried out by surveillance staff.

SUMMARY OF THE INVENTION

In view of the foregoing, it is an object of the present invention to provide an administrative system and related equipment that make it possible to manage whether or not surveillance staff have been to predetermined locations on a patrol surveillance route.

According to one aspect of the present invention, for achieving the above-mentioned object, there is provided an administrative system for managing surveillance by surveillance staff carrying out patrol surveillance, comprising surveillance means, provided in a plurality of locations on a patrol surveillance route, for reading first identification information that is stored in an information storage medium carried by the surveillance staff, and for transmitting this first identification information; and management means for receiving the first identification information transmitted by the surveillance means and storing this first identification information in relation to second identification information that identifies the surveillance means.

Consequently, it is possible to manage whether or not surveillance staff have been to predetermined locations on a patrol surveillance route.

According to another aspect of the present invention, there is provided an administrative system for managing surveillance by surveillance staff carrying out patrol surveillance, comprising surveillance means, provided in a plurality of locations on a patrol surveillance route, for writing surveillance management information for surveillance management to an information storage medium carried by the surveillance staff and management means for reading out surveillance management information from the information storage medium, and storing this information.

Consequently, it is possible to manage whether or not surveillance staff have been to predetermined locations on a patrol surveillance route.

BRIEF DESCRIPTION OF THE DRAWINGS

FIG. 5 is an example of information stored in memory of a management apparatus according to the present invention.

FIG. 7 shows an example of a management table according to the present invention.

DETAILED DESCRIPTION OF THE PREFERRED EMBODIMENTS

Preferred embodiments of the invention will now be described in detail referring to the accompanying drawings.

Three kinds of embodiment of the invention, namely a first embodiment, second embodiment and a third embodiment, and a further embodiment of the invention, will be described hereinbelow in the embodiments of the present invention.

According to the first embodiment of the invention, in an administrative system, IC cards carried by surveillance staff are read, data is transmitted to a management apparatus so that the surveillance activities of surveillance staff are centrally managed by this management apparatus.

According to the second embodiment of the invention, information to confirm whether or not surveillance has been carried out is written by surveillance boxes to the IC cards themselves which are carried by surveillance staff.

According to the third embodiment of the invention, the administrative system is also equipped with a function in the form of a card key system.

First Embodiment of the Invention

Three kinds of system are described in the first embodiment of the invention. The first system is a system in which card IDs are read by means of surveillance boxes. The second system is a system in which card IDs are read by means of network devices and interconnecting devices. The third system is a system in which card IDs are read by means of surveillance boxes, network devices and interconnecting devices. A straightforward description relating to the configuration of each system will be followed by a description of each of the constituent elements of the third system as well as a description of the process flow thereof.

Figure 1:
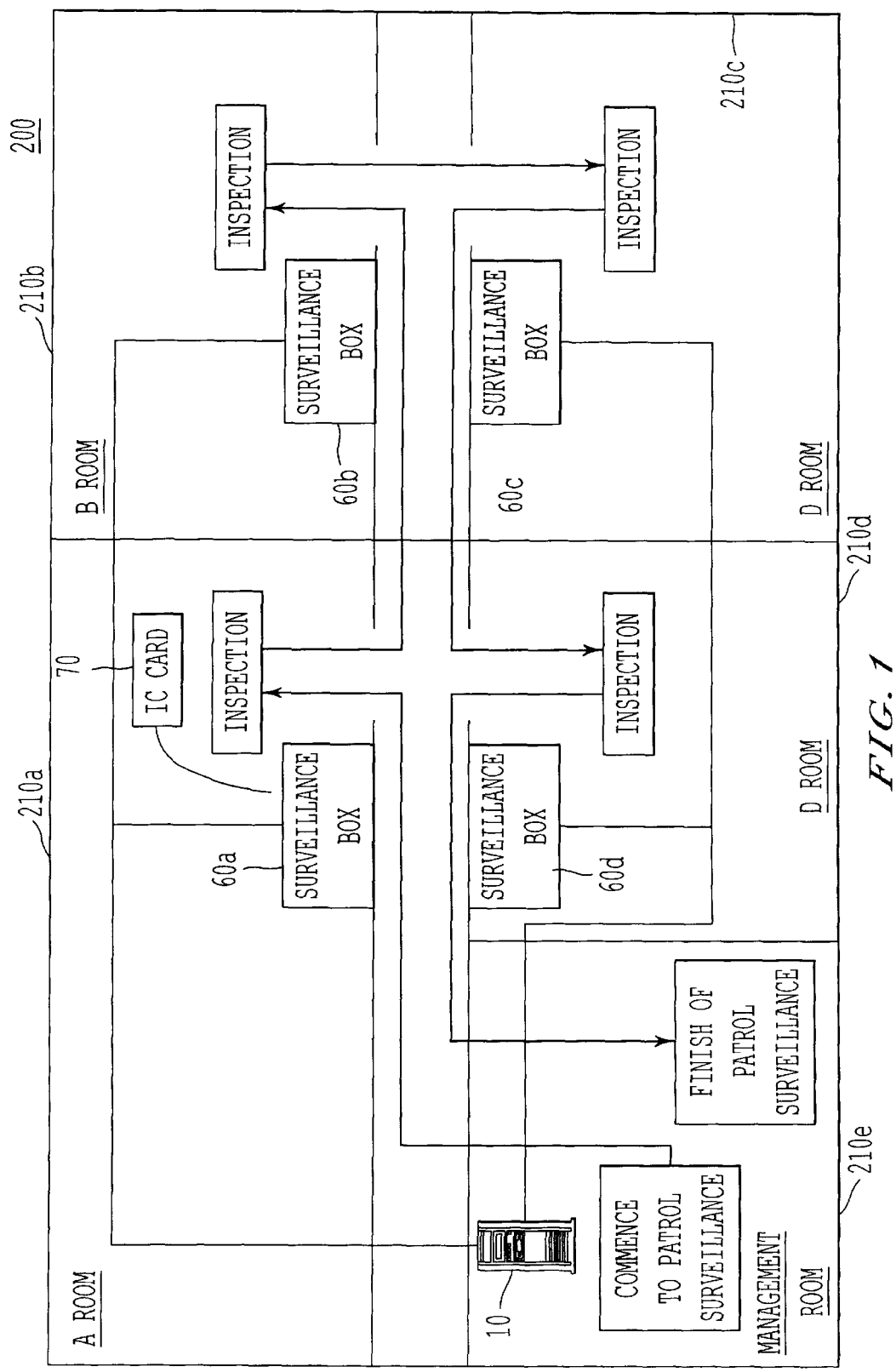
FIG. 1 shows a configuration of system according to the present invention.

FIG. 1 provides an overview of the configuration of the first system and of patrol surveillance movements made by surveillance staff. In this example, as shown by the route in the figure that is followed by the surveillance staff, surveillance staff exit the management room 210e, carry out sequential surveillance of an A room 210a, a B room 210b, a C room 210c, and a D room 210d, and then return once more to the management room 210e.

An IC card 70, which has a card ID pre-stored thereon, is distributed to the surveillance staff. The surveillance staff are then required to carry this IC card 70 when carrying out patrol surveillance. In a case in which patrol surveillance is carried out, surveillance staff initially perform registration, to commence patrol surveillance, with respect to a management apparatus 10 installed in the management room. Then, when surveillance and inspection of A room 210a, which is to be the subject of initial surveillance, has been completed, the surveillance staff insert their personal IC cards 70 into a surveillance box 60a. The surveillance box 60a then reads the card IDs from the inserted IC cards 70 and transmits these card IDs to the management apparatus 10 in the management room 210e. This management apparatus 10 receives these card IDs, and, on the basis of the port that receives the card IDs, recognizes the surveillance box 60a that is connected to this port, and stores the card IDs, and identification information on the surveillance box 60a, in predetermined storage means. The same process is performed for B room 210b, C room 210c, and D room 210d, By means of such processing, the management apparatus 10 is at least capable of confirming whether or not surveillance staff have been to prescribed surveillance positions and therefore of managing surveillance activities.

The configuration of the first system will now also be described using FIG. 1.

A building 200, which is to be the subject of surveillance, has a management room 210e, an A room 210a, a B room 210b, a C room 210c and a D room 210d, and these rooms also constitute surveillance areas 210. Further, with regard to the building to which the present invention may be applied, the number of rooms is not limited to the number described here, and the building need not have a separate management room. There are also no restrictions on the structural configuration of the building. Moreover, surveillance is not limited to surveillance of the rooms of a single building. Rather, there may also be cases in which patrol surveillance of a plurality of buildings is performed.

A management apparatus 10 is provided in management room 210e. This management apparatus 10 receives information from a surveillance box 60 with which each of the rooms is provided, and has a basic function of managing the surveillance situation. According to a preferable configuration, the management apparatus 10 is equipped with an IC card reader/writer that writes information to the IC cards 70 and also reads information therefrom.

A surveillance box 60 is provided in the vicinity of the entrance/exit opening of each room. It is desirable that this surveillance box 60 should be provided inside the rooms. As a result, the surveillance staff need not necessarily enter a room to operate a surveillance box 60, meaning that reliable surveillance of the room can be expected. The surveillance boxes 60 are connected so as to be capable of communicating with the management apparatus 10 by means of wire-based or wireless communications. These surveillance boxes 60 are equipped with an IC card reader and are thus capable of reading card IDs from the IC cards 70.

Figure 2:
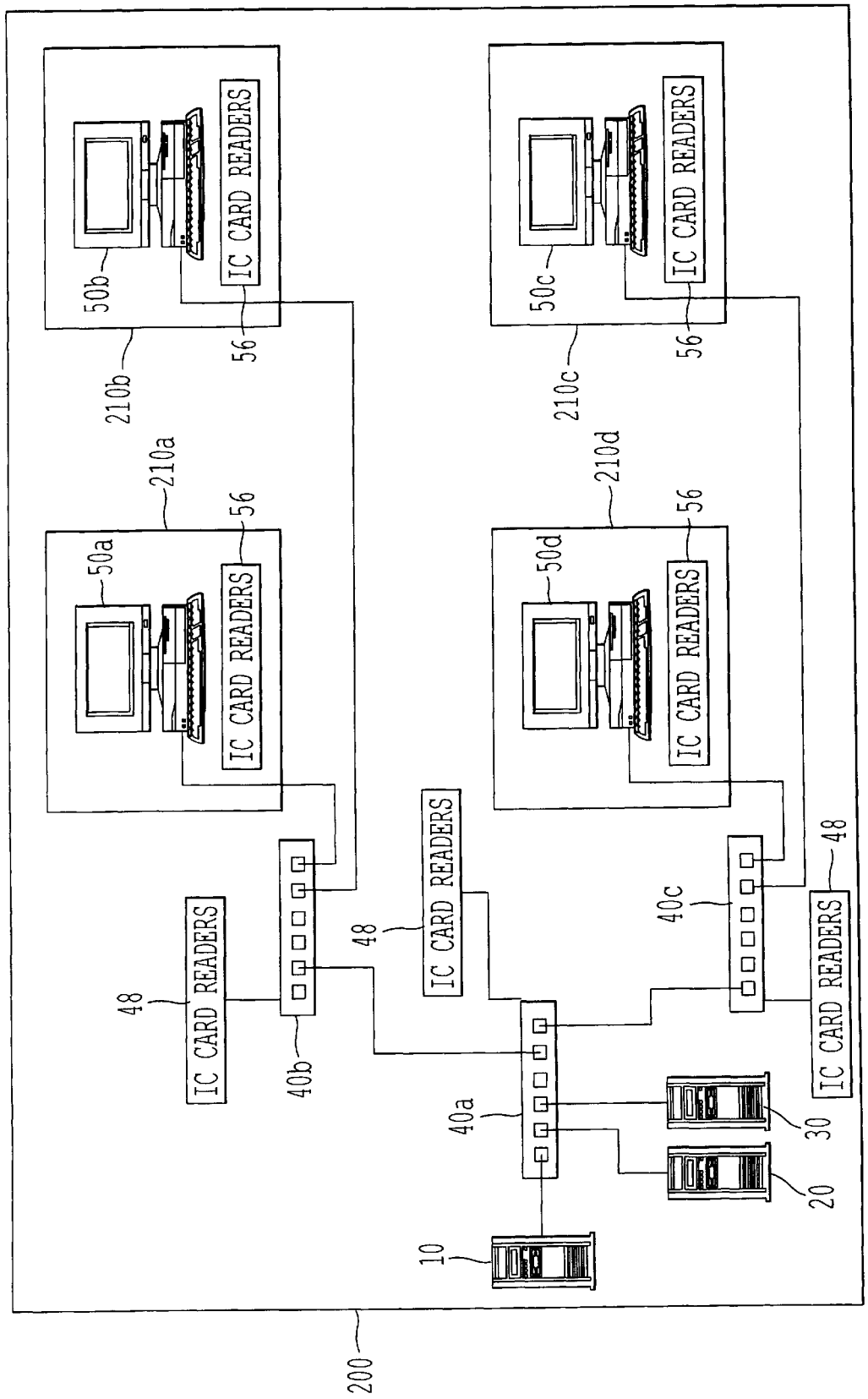
FIG. 2 shows a configuration of other system according to the present invention.

Next, the configuration of the second system will be described using FIG. 2. This administrative system 1 is equipped with a management apparatus 10, an entrance server 20, a DHCP server 30, interconnecting devices 40, and network devices 50.

Interconnecting devices 40 are provided in the building 200, and by means of connection with the interconnecting devices 40, it is possible to construct a network between the surveillance regions 210. Network devices 50a to 50d are provided in the surveillance regions 210a to 210d respectively.

Of these network devices 50a to 50d, network devices 50a and 50b are connected to the interconnecting device 40b, and network devices 50c and 50d are connected to the interconnecting device 40c, and a network is thus formed inside the building 200 by connecting these interconnecting devices 40b and 40c to the interconnecting device 40a. In addition, the management apparatus 10, the entrance server 20, and the DHCP server 30 are connected to the interconnecting device 40a. The management apparatus 10, the entrance server 20, and the DHCP server 30 are installed in a location permitting general management of the building 200, for example, in the management room for managing the building 200.

These network devices 50 and interconnecting devices 40 are each equipped with an IC card reader 56 and 48 respectively. Also, these network devices 50 and interconnecting devices 40 function in the same way as the above-described surveillance boxes. In other words, the network devices 50 read the card IDs, which are stored in the IC cards 70, by means of these IC card readers 56, and transmit these card IDs to the management apparatus 10. Further, the interconnecting devices 40 also read the card IDs, which are stored in the IC cards 70, by means of these IC card readers 48, and transmit these card IDs to the management apparatus 10.

Figure 3:
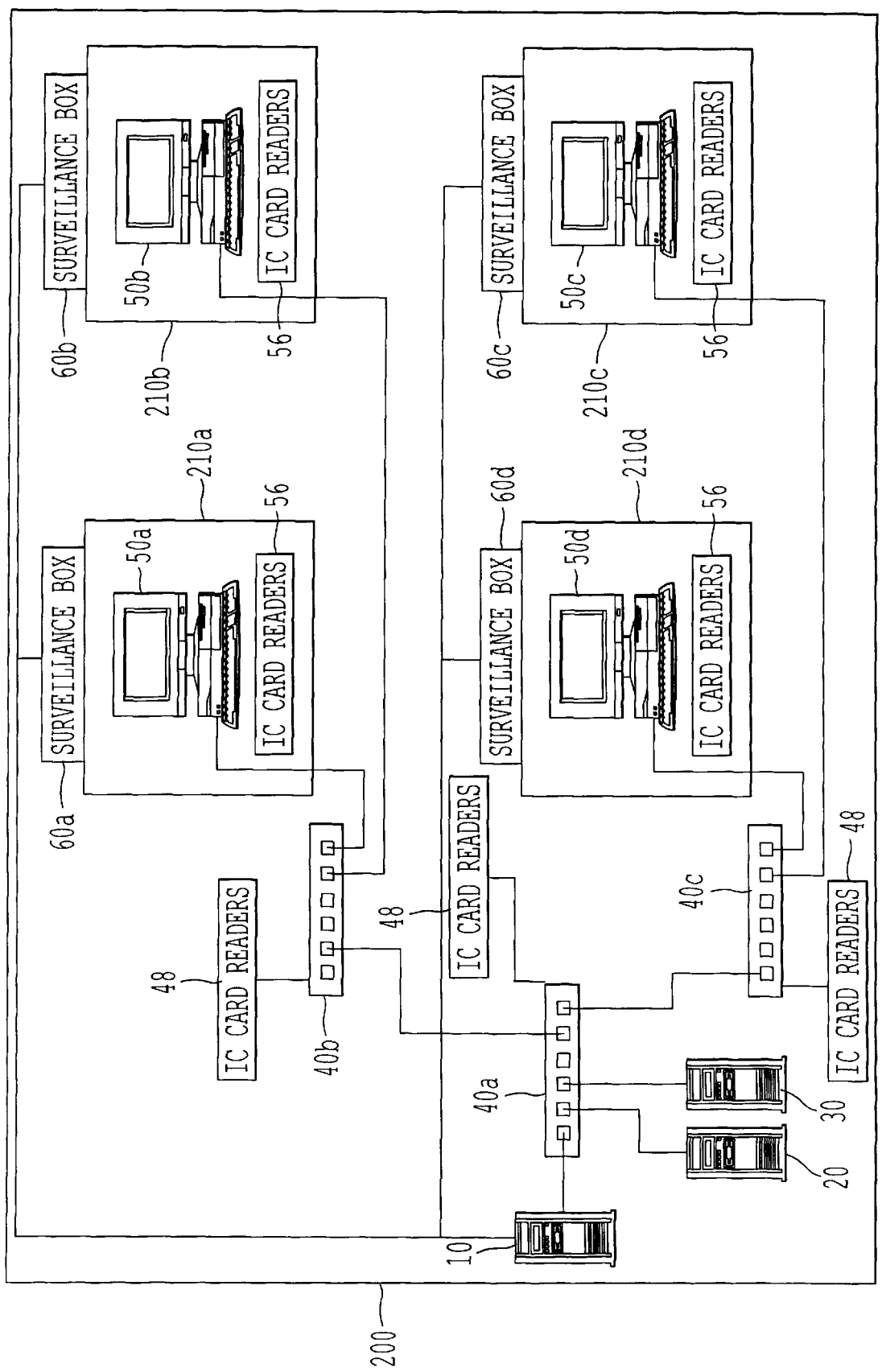
FIG. 3 shows a configuration of other system according to the present invention.

Next, the configuration of the third system will be described using FIG. 3. This administrative system 1 is equipped with a management apparatus 10, an entrance server 20, a DHCP server 30, interconnecting devices 40, network devices 50, and surveillance boxes 60.

Interconnecting devices 40 are provided in the building 200, and by means of connection with the interconnecting devices 40, it is possible to construct a network between the surveillance regions 210. Network devices 50a to 50d are provided in the surveillance regions 210a to 210d respectively.

Of these network devices 50a to 50d, network devices 50a and 50b are connected to the interconnecting device 40b, and network devices 50c and 50d are connected to the interconnecting device 40c, and a network is thus formed inside the building 200 by connecting these interconnecting devices 40b and 40c to the interconnecting device 40a. In addition, the management apparatus 10, the entrance server 20, and the DHCP server 30 are connected to the interconnecting device 40a. The management apparatus 10, the entrance server 20, and the DHCP server 30 are installed in a location permitting general management of the building 200, for example, in the management room for managing the building 200.

These network devices 50 and interconnecting devices 40 are each equipped with an IC card reader 56 and 48 respectively. Also, these network devices 50 and interconnecting devices 40 function in the same way as the above-described surveillance boxes. In other words, the network devices 50 read the card IDs, which are stored in the IC cards 70, by means of these IC card readers 56, and transmit these card IDs to the management apparatus 10. Further, the interconnecting devices 40 also read the card IDs, which are stored in the IC cards 70, by means of these IC card readers 48, and transmit these card IDs to the management apparatus 10.

In addition, the surveillance boxes 60a to 60d are respectively placed in rooms 210a to 210d.

Next, each of the constituent elements of the third system will be described.

Figure 4:
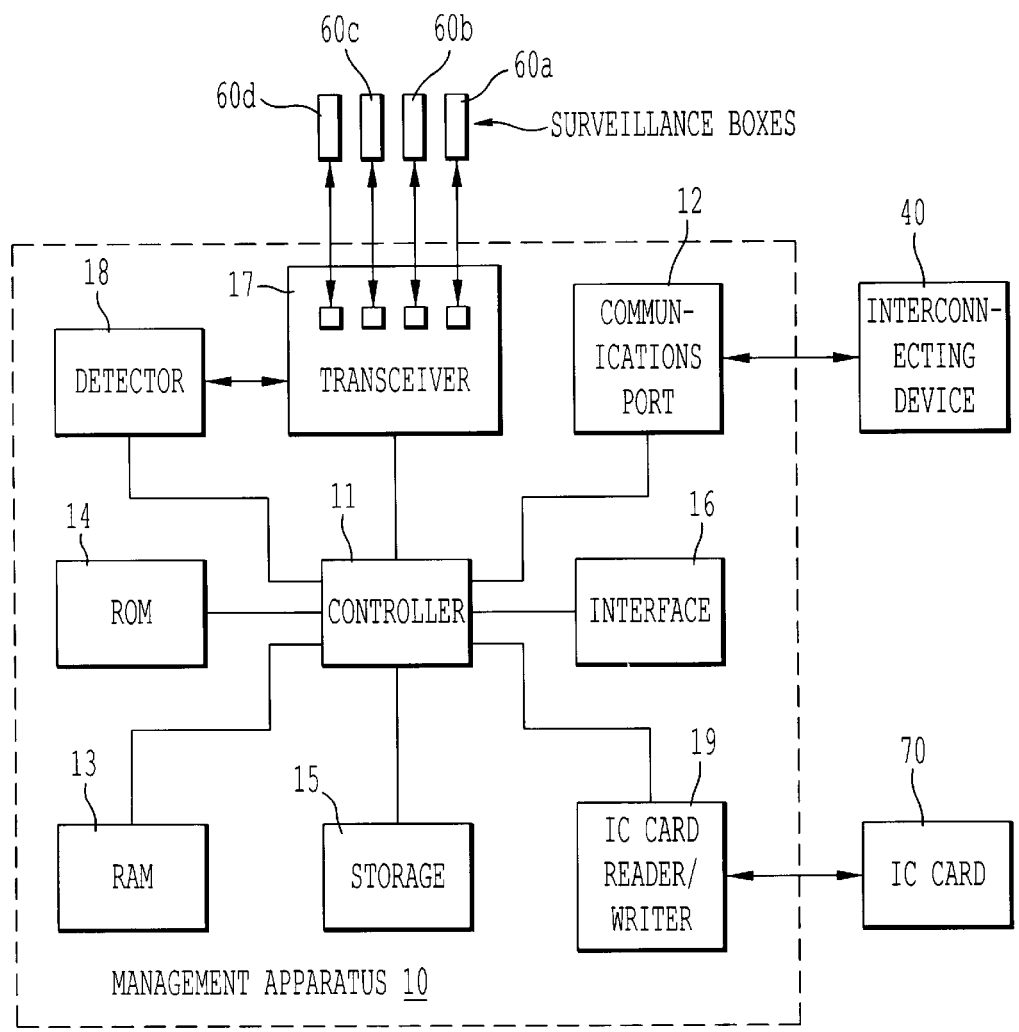
FIG. 4 is a block diagram showing a management apparatus according to the present invention.

First, the configuration of the management apparatus 10 will be described using FIG. 4. The management apparatus 10 manages the network and also the surveillance boxes 60. The management apparatus 10 sets the interconnecting devices 40 to form a VLAN (Virtual Local Area Network) in which the areas 210 differ from one another on the basis of the device identifier of each of the network devices 50. Furthermore, the management apparatus 10 receives information, which is transmitted from the surveillance boxes 60, interconnecting devices 40, or network devices 50, and stores this information in predetermined storage areas.

This management apparatus 10 may be constituted by a computer such as a personal computer (PC), a dedicated computer, or a server computer, for example. As shown in FIG. 4, the management apparatus 10 is equipped with a controller 11, a communications port 12, a RAM 13, a ROM 14, a storage portion 15, an interface 16, a transceiver 17, a detector portion 18, and an IC card reader/writer 19. Note that devices attached to the management apparatus 10 have been omitted from FIG. 4, namely input/output devices such as a keyboard, a mouse, or other such pointing devices, and a display or another display device.

The controller 11 is a processing device such as a CPU or MPU, and controls each of the parts of the management apparatus 10. The controller 11 has at least the functions of receiving card IDs transmitted from the surveillance boxes 60 and storing these card IDs, and identification information on the surveillance boxes, in the storage portion 15.

The communications port 12 includes a LAN adapter, which provides a connection to an interconnecting device 40, and a USB port or an IEEE 1394 port, for example, that is capable of a connection via a modem, terminal adapter (TA), or similar, to a public switched telephone network, ISDN, or any kind of private line, which is connected to the Internet.

Data, which is read out from the RAM 13, the ROM 14, or the storage portion 15, and data, which is written to the storage portion 15, for example, is stored temporarily. The ROM 14 holds a variety of software or firmware required for the operation of the controller 11, and other software.

The storage portion 15 serves for storage of operation programs required for the management of the surveillance boxes 60, and information received from the surveillance boxes 60. In addition, the storage portion 15 holds operation programs required for the management of the interconnecting devices 40 and the network devices 50, as well as information received from these devices 40 and 50.

An example of the information stored in the storage portion 15 will now be described using FIG. 5. As shown in the figure, in this example, inter-relational storage is performed of time information, surveillance box IDs, and information on alert buttons and relational data files. Here, time information is information relating to the time of reception of information transmitted from the surveillance boxes 60, interconnecting devices 40 and network devices 50. A transmission ID is specific identification information allocated to each surveillance box 60, interconnecting device 40, and network device 50. In the present example, "box-a" indicates the identification information for the surveillance box 60a. Further, "net-c" indicates identification information for the network device 50c. Alert button information is information that indicates whether or not the alert button provided on a surveillance box 60 has been depressed. Relational data file information is information that identifies data files inputted by surveillance staff in relation to patrol surveillance. In the present example, the file names are shown. In the first embodiment, for the purpose of adopting a configuration enabling surveillance staff to make voice inputs, these files are voice files. In a configuration enabling the input of image data, these files are image files.

The interface 16 is, for example, a USB port or parallel port, and connects the management apparatus 10 and an external device. Possible interfaces include a data transfer type interface performing parallel or serial transfer, for example, and indeed any kind of medium that makes a wireless or wire-based connection. The use of the interface 16 by the management apparatus 10 makes it possible to connect an MO drive or an FD drive thereto.

The transceiver 17 connects the management apparatus 10 and the surveillance boxes 60 for the purpose of performing communications with the surveillance boxes 60. The transceiver 17 has a number of ports corresponding to the surveillance boxes 60 and a port is allocated to each of the surveillance boxes 60. A serial cable, parallel cable, or the like, maybe employed for the connection between the transceiver 17 and the surveillance boxes 60, and the transceiver 17 maybe constituted in the form of a plurality of ports that connect to each of these surveillance boxes 60.

The detector portion 18 detects signals transmitted from the surveillance boxes 60 by means of interaction with each of the ports of the transceiver 17, and reports information on these transmissions to the controller 11. In this manner, the controller 11 identifies the ports and is thus able to receive these signals. This detector portion 18 detects the voltage of a relay port 42 through comparison with a predetermined slice level, for example.

The IC card reader/writer 19 performs the function of reading information stored by the IC cards 70 and writing information to the IC cards 70.

Figure 6:
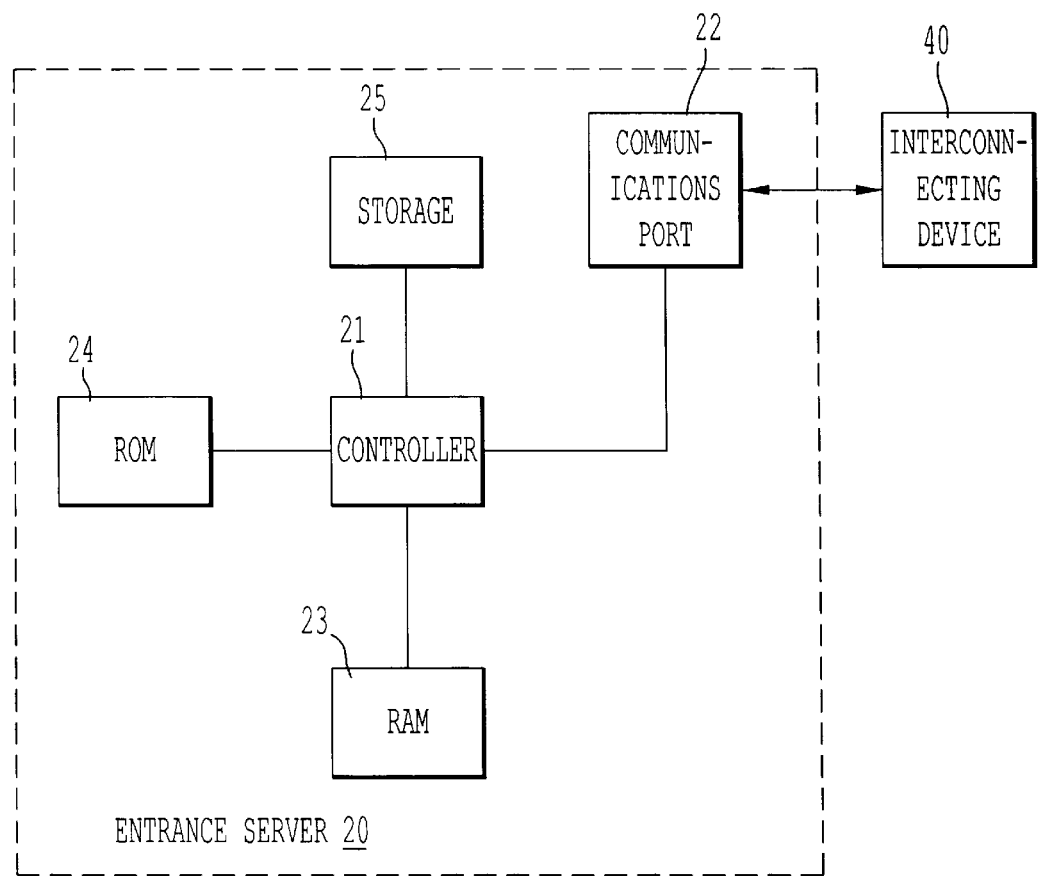
FIG. 6 is a block diagram showing a entrance server according to the present invention.

Next, a detailed explanation will follow of the configuration of the entrance server 20 using FIG. 6.

The controller 21 is a processing device such as a CPU or MPU, and controls each of the parts of the entrance server 20.

The communications port 22 includes a LAN adapter, which provides a connection to an interconnecting device 40, and a USB port or an IEEE 1394 port, for example, that is capable of a connection via a modem, terminal adapter (TA), or similar, to a public switched telephone network, ISDN, or any kind of private line, which is connected to the Internet.

Data, which is read out from the RAM 23, the ROM 24, or the storage portion 25, and data, which is written to the storage portion 25, for example, is stored temporarily. The ROM 24 holds a variety of software or firmware required for the operation of the controller 21, and other software.

The storage portion 25 holds a management table creation program for creating the management table shown in FIG. 7, and the management table thus created. In a case in which four network devices 50 are connected to a network or to a subnet that constitutes a network segment, the management table of the present embodiment contains the relationships between the areas 210, and the communications parameters for the corresponding network devices 50 and the information on these network devices 50. More particularly, the management table contains, in order starting from the top of the table, as shown in FIG. 7, the corresponding identifier, MAC address, IP address, user ID, and password.

Identifiers 101, 102, 103, and 104, identify the four areas 210a, 210b, 210c and 210d, respectively. MAC (Media Access Control) addresses are addresses that identify each of the information devices connected to the LAN, and are known as the hardware addresses of the interconnecting devices disposed in the communications paths leading to given IP addresses. IP (Internet Protocol) addresses are addresses allocated to computers that are connected to a TCP/IP network environment, and are expressed using numbers in base 10 from 0 to 255 separated by periods into four blocks. IP addresses are contained in IP headers, provided according to the IP protocol, disposed in the TCP/IP protocol network layer. The user IDs and passwords are identifiers used for identifying a user when the user of a network device 50 logs onto the network. It is preferable that a user ID and a password should be predetermined while a network device is being used offline, before each of the communications parameters is set in a network device 50 by the user of a network device 50.

In the present embodiment, the communications parameters are a user ID and password, and an IP address allocated by the DHCP server 30, but a subnet mask and a default gateway may also be included.

The DHCP server 30 allocates communications parameters to a plurality of network devices 50. Communications parameters include the above-mentioned IP address, a subnet mask, and a default gateway.

Figure 8:
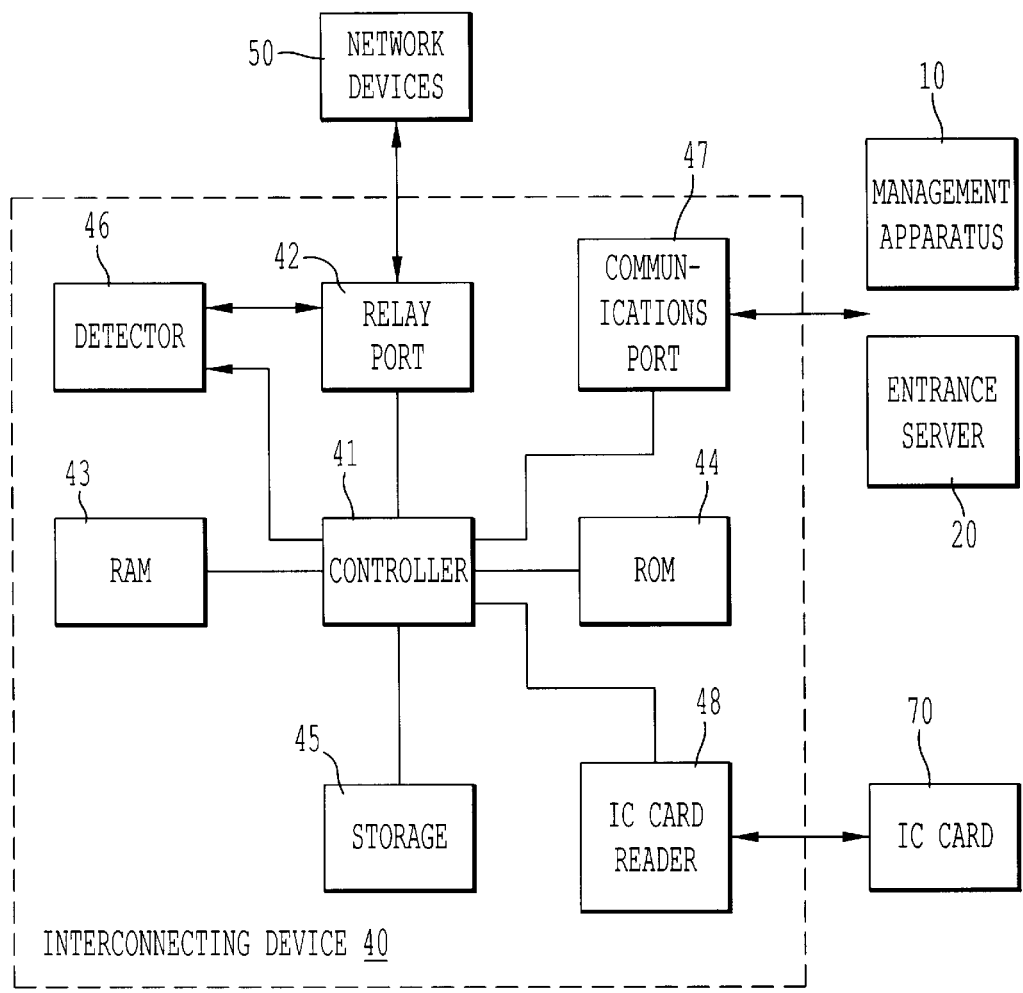
FIG. 8 is a block diagram showing an interconnecting device according to the present invention.

Next, a detailed explanation will follow of the configuration of the interconnecting devices 40 using FIG. 8. An interconnecting device 40 connects network devices 50 to a network 100. The interconnecting device 40 is a switching hub, for example, but may also be constituted from a switch, a router, or another kind of concentrator, or from a PC or a wireless interconnecting device, or the like. Further, in the present embodiment, the interconnecting device 40 comprises an IC card reader 48. Therefore, similarly to the surveillance box 60, the interconnecting devices 40 are capable of reading information such as a card ID by means of an IC card 70 carried by the surveillance staff, and of transmitting this information to the management apparatus 10.

As shown in FIG. 8, the interconnecting device 40 is equipped with a controller 41, a relay port 42, a RAM 43, a ROM 44, a storage portion 45, a detector portion 46, a communications port 47, and an IC card reader 48. In the interests of expediency, FIG. 8 has also been simplified through the omission of input/output devices and display devices that are attached to the interconnecting device 40.

The controller 41 is a processing device such as a CPU or MPU, and controls each of the parts of the interconnecting device 40. The controller 41 communicates with the detector portion 46 to provide the entrance server 20 with information that identifies the network devices 50, and, in accordance with instructions from the management apparatus 10, manages the relay port 42 for the purpose of logically dividing up the network, on the basis of the MAC addresses of the network devices 50 that are connected to this interconnecting device 40.

The relay port 42 is a communications port that is connected to the network devices 50 by means of a cable, for example. More particularly, the interconnecting devices 40b and 40c are connected to the relay port of the interconnecting device 40a. In addition, the network devices 50a and 50b are connected to the relay port of the interconnecting device 40b, and the network devices 50c and 50d are connected to the relay port of the interconnecting device 40c.

Data, which is read out from the RAM 43, the ROM 44, or the storage portion 45, and data, which is written to the storage portion 45, for example, is stored temporarily. The ROM 44 holds a variety of software or firmware required for the operation of the controller 41, and other software. The storage portion 45 holds a program for managing the relay port 42.

The detector portion 46 detects the activation of the power supply of the network devices 50 by communicating with the relay port 42, and reports this power activation to the controller 41. This detector portion 46 functions in the same way as the detector portion 18 of the management apparatus 10 described above.

The communications port 47 includes a LAN adapter, and a USB port or an IEEE 1394 port, for example, that is capable of a connection via a modem, terminal adapter (TA), or similar, to a public switched telephone network, ISDN, or any kind of private line, which is connected to the Internet. The interconnecting device 40 is able to communicate with the management apparatus 10 and the entrance server 20 via the communications port 47.

The IC card reader 48 has the function of reading information such as a card ID that is stored in an IC card 70. The information thus read, which is a card ID or the like, may then be transmitted by means of the controller 41 to the management apparatus 10 via the communications port 47.

Next, the configuration of the network devices 50 will be described using FIG. 9. The network devices 50 are to be managed by the management apparatus 10, and are, for example, network devices such as hubs, switches, routers, or another kind of concentrator, interconnecting devices, bridges, gateway devices, PCs, servers, wireless interconnecting devices, or game devices having a communications function. Further, in the present embodiment, the network devices 50 each comprise an IC card reader 56. Therefore, similarly to the interconnecting devices 40 and the surveillance boxes 60, these network devices 50 are capable of reading information such as a card ID by means of an IC card 70 possessed by the surveillance staff, and of transmitting this information to the management apparatus 10.

Figure 9:
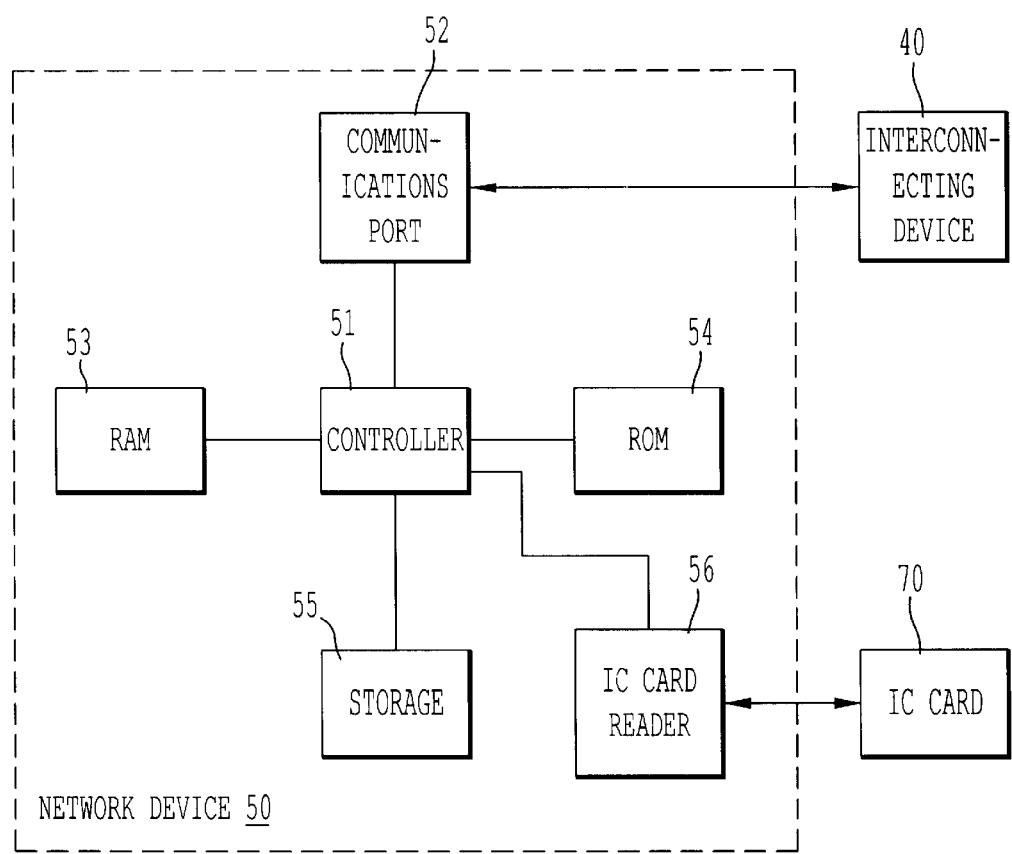
FIG. 9 is a block diagram showing a network device according to the present invention.

As shown in FIG. 9, the network devices 50 each have a controller 51, a communications port 52, a RAM 53, a ROM 54, a storage portion 55, and an IC card reader 56. In the interests of expediency, FIG. 9 has also been simplified through the omission of input/output devices and display devices that are attached to the network devices 50. An operator of a network device 50 is able to use an input device to input data of whatever form to the storage portion 55, and to download required software to the RAM 53, the ROM 54 or the storage portion 55.

The controller 51 is a processing device such as a CPU or MPU, and controls each of the parts of the network device 50. If the surveillance boxes 60 are connected as described above, the controller 51 is also capable of transmitting data to these surveillance boxes 60 via an interface (not shown).

The communications port 52 includes a LAN adapter, which provides a connection with a network, and a USB port or an IEEE 1394 port, for example, that is capable of a connection via a modem, terminal adapter (TA), or similar, to a public switched telephone network, ISDN, or any kind of private line, which is connected to the Internet. In the present embodiment, the communications port 52 is an interface that is connected to the relay port 42 of an interconnecting device 40.

Data, which is read out from the RAM 53, the ROM 54, or the storage portion 55, and data, which is written to the storage portion 55, for example, is stored temporarily. The ROM 54 holds a variety of software or firmware required for the operation of the controller 51, and other software. The storage portion 55 holds communications parameters and corresponding set programs. These set programs are programs that are set after communications parameters have been received from the DHCP server 30.

The IC card reader 56 has the function of reading information such as a card ID that is stored in an IC card 70. The information thus read, which is a card ID or the like, may then be transmitted by means of the controller 51 to the management apparatus 10 via the communications port 52.

Next, the configuration of the surveillance boxes 60 will be described using FIG. 10. As described hereinabove, these surveillance boxes 60 have the basic functions of reading identification information such as card IDs from the IC cards 70 of the surveillance staff, and of transmitting this information to the management apparatus 10. However, there are no particular restrictions on the shape of these surveillance boxes 60. These surveillance boxes 60 may be box-shaped or flat.

Figure 10:
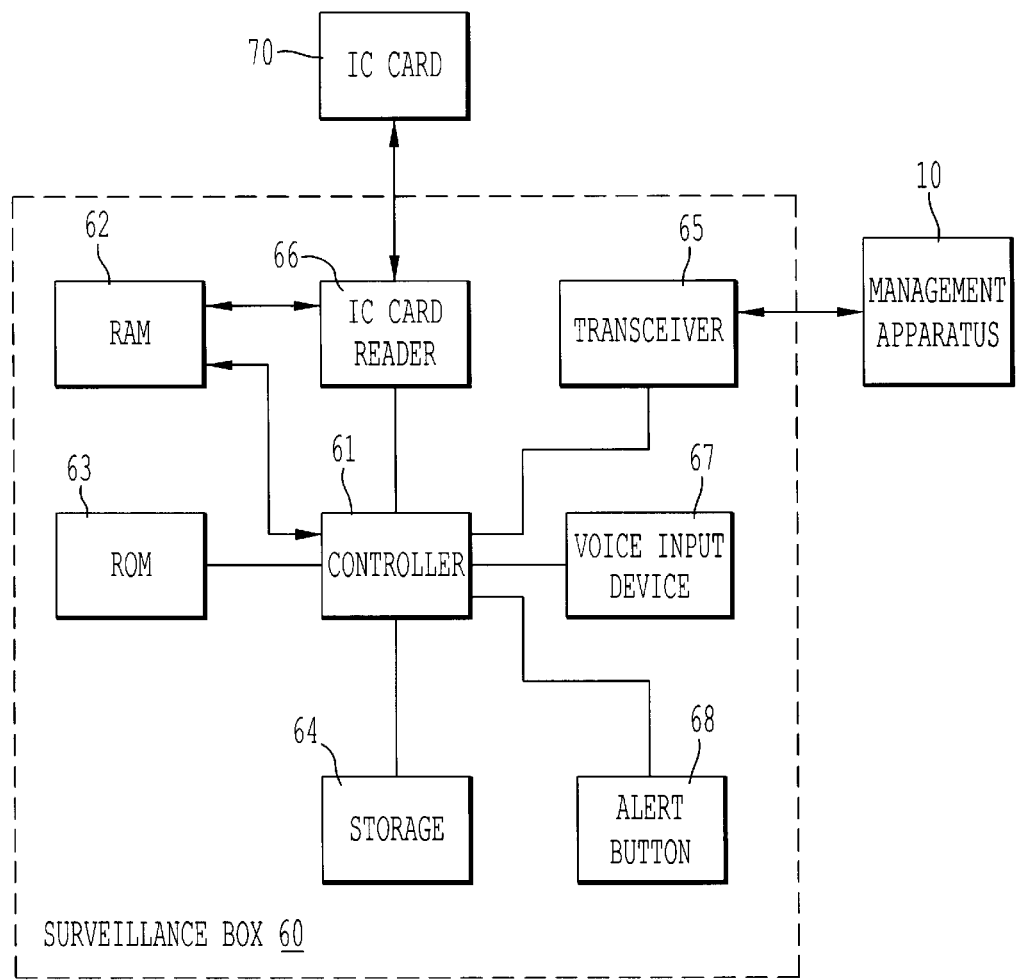
FIG. 10 is a block diagram showing a surveillance box according to the present invention.

As shown in FIG. 10, the surveillance boxes 60 are at least equipped with a controller 61, a RAM 62, a ROM 63, a storage portion 64, a transceiver 65, an IC card reader 66, a voice input device 67, and an alert button 68.

The controller 61 is a processing device such as a CPU or MPU, and controls each of the parts of the surveillance boxes 60. This controller 61, for example, controls the IC card reader 66, reads identification information such as card IDs from the IC cards 70 of the surveillance staff, and transmits this information to the management apparatus 10 via the transceiver 65.

Data, which is read out from the RAM 62, the ROM 63, or the storage portion 64, and data, which is written to the storage portion 64, for example, is stored temporarily. The ROM 63 holds a variety of software or firmware required for the operation of the controller 61, and other software.

The storage portion 64 temporarily stores identification information such as card IDs that are read from the IC cards 70.

The transceiver 65 has the functions of transmitting information to the management apparatus 10 and receiving information from the management apparatus 10.

The IC card reader 66 has the function of reading information such as a card ID that is stored in an IC card 70.

The voice input device 67 is, for example, a microphone or a voice processing circuit. This device may be used by surveillance staff to make a voice recording regarding an unusual event or to report a state of emergency to the management room.

When the alert button 68 is depressed by a surveillance staff member when he or she judges that a state of emergency exists, alert information may be transmitted to the management apparatus 10. In such a case, the management apparatus 10 conveys an alert to a manager, for example, using a variety of conveyance means. These conveyance means may be in the form of: visual conveyance means, such as the appearance of an item on a display, or the flicker of an alert lamp; audio conveyance means, such as an output from a buzzer or a speaker; or conveyance means employing vibration. Furthermore, a plurality of different kinds of alert button 68 may also be provided that correspond to varying degrees of emergency.

Figure 11:
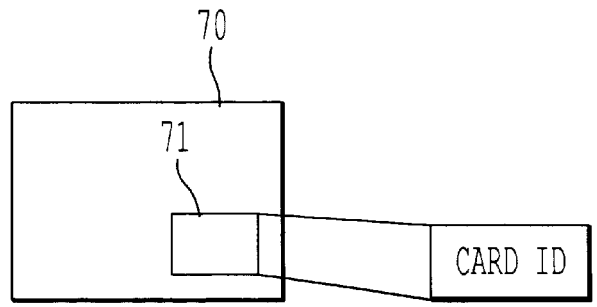
FIG. 11 is a diagram showing a configuration of IC card.

Next, the configuration of the IC cards 70 will be described using FIG. 11. As shown in the figure, an IC chip 71 is buried within the body of the IC card 70. This IC chip has a storage element, and a card ID is stored by this storage element. This card ID need not pertain to an individual card. Instead, identification information may pertain to the surveillance staff. As a result, a plurality of IC cards holding the same information may also be distributed to surveillance staff. Further, a MAC address or an IP address may also serve as this identification information.

In addition, by means of an IC card reader, it is possible to read out a card ID that is stored by the storage element of an IC card 70. Also, by means of an IC card reader/writer, it is possible to write predetermined information, such as a card ID, to the storage element of an IC card 70.

Figure 12B:
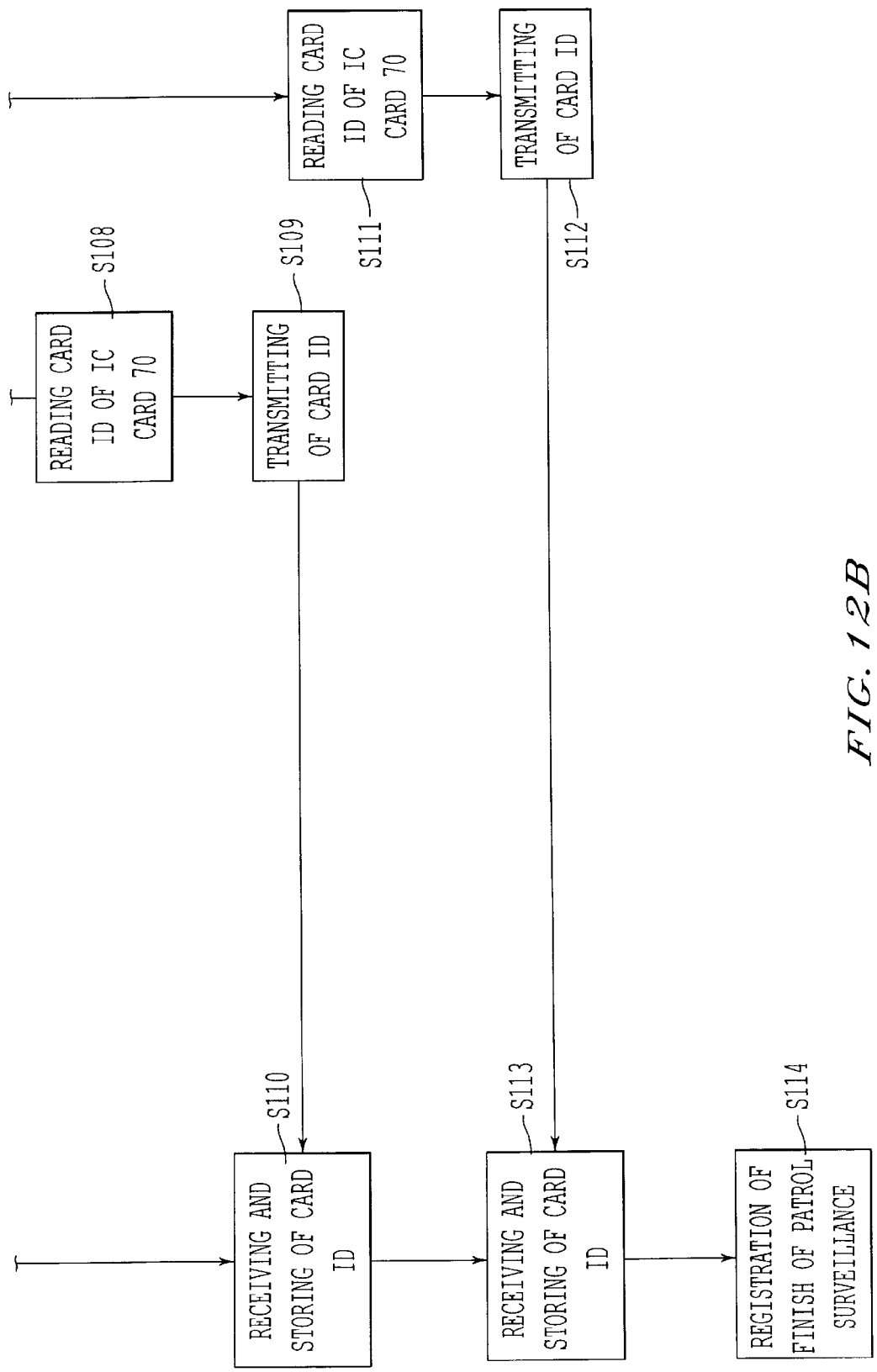
FIG. 12 is a flowchart showing a process of an administrative system according to the present invention.

A description will now follow using FIG. 12 with regard to processing, in an administrative system like that of the first embodiment of the present invention, in a case where patrol surveillance is carried out. In the example below, a case is described in which surveillance staff insert IC cards 70 into the surveillance boxes 60. However, processing is the same in cases where IC cards 70 are inserted into the interconnecting devices 40 and the network devices 50.

First, in order to commence patrol surveillance, surveillance staff operate the management apparatus 10 to perform registration of patrol surveillance (S101). More specifically, surveillance staff use an input means such as a keyboard (not shown) to make an input to the management apparatus 10 regarding the start of patrol surveillance. Surveillance staff then use the IC card reader writer 19, with which the management apparatus 10 is equipped, to allow a card ID to be read that is stored in his or her personal IC card 70. The card ID thus read by the IC card reader/writer 19 is temporarily stored by the storage portion 15 of the management apparatus 10. The management apparatus 10 then begins time measurements on the basis of inputs made in the course of the patrol surveillance or inputs of the card ID. When there is no information transmission whatever from the surveillance boxes 60 within prescribed fixed periods following the above-mentioned inputs, it is possible to judge that the patrol surveillance is not being carried out correctly, and therefore to issue an alert.

Thereafter, a surveillance staff member performs inspection and surveillance of the A room, which is the area 210a to first undergo patrol surveillance. When the surveillance staff member has completed this inspection and surveillance, he or she inserts a personal IC card 70 into the IC card reader 66 of the surveillance box 60a with which the A room is provided. The IC card reader 66 then reads the card ID that is stored in the IC card 70 (S102). The surveillance box 60a then transmits the card ID thus read to the management apparatus 10 (S103).

The management apparatus 10 receives the card ID and stores same in the storage portion 15 (S104). At this time, the management apparatus 10 judges that, on the basis of information on the port receiving the card ID, the source of the transmission of this card ID is the surveillance box 60a, and then stores the box ID of the surveillance box 60*a* in relation to this card ID. In addition, information regarding the time at which the card ID was received is also stored in relation to this card ID and box ID.

Thereafter, the surveillance staff member performs inspection and surveillance of the B room, which is the area 210*b* that occurs next on the patrol surveillance route. When the surveillance staff member has completed this inspection and surveillance, he or she inserts a personal IC card 70 into the IC card reader 66 of the surveillance box 60*b* with which the B room is provided. The IC card reader 66 then reads the card ID that is stored in the IC card 70 (S105). The surveillance box 60*b* then transmits the card ID thus read to the management apparatus 10 (S106).

The management apparatus 10 receives the card ID and stores same in the storage portion 15 (S107). At this time, the management apparatus 10 judges that, on the basis of information on the port receiving the card ID, the source of the transmission of this card ID is the surveillance box 60*b*, and then stores the box ID of the surveillance box 60*b* in relation to this card ID. In addition, information regarding the time at which the card ID was received is also stored in relation to this card ID and box ID.

Thereafter, the surveillance staff member performs inspection and surveillance of the C room, which is the area 210*c* that occurs next on the patrol surveillance route. When the surveillance staff member has completed this inspection and surveillance, he or she inserts a personal IC card 70 into the IC card reader 66 of the surveillance box 60*c* with which the C room is provided. The IC card reader 66 then reads the card ID that is stored in the IC card 70 (S108). The surveillance box 60*c* then transmits the card ID thus read to the management apparatus 10 (S109).

The management apparatus 10 receives the card ID and stores same in the storage portion 15 (S110). At this time, the management apparatus 10 judges that, on the basis of information on the port receiving the card ID, the source of the transmission of this card ID is the surveillance box 60*c*, and then stores the box ID of the surveillance box 60*c* in relation to this card ID. In addition, information regarding the time at which the card ID was received is also stored in relation to this card ID and box ID.

Thereafter, the surveillance staff member performs inspection and surveillance of the D room, which is the area 210*d* that occurs next on the patrol surveillance route. When the surveillance staff member has completed this inspection and surveillance, he or she inserts a personal IC card 70 into the IC card reader 66 of the surveillance box 60*d* with which the D room is provided. The IC card reader 66 then reads the card ID that is stored in the IC card 70 (S111). The surveillance box 60*d* then transmits the card ID thus read to the management apparatus 10 (S112).

The management apparatus 10 receives the card ID and stores same in the storage portion 15 (S113). At this time, the management apparatus 10 judges that, on the basis of information on the port receiving the card ID, the source of the transmission of this card ID is the surveillance box 60*d*, and then stores the box ID of the surveillance box 60*d* in relation to this card ID. In addition, information regarding the time at which the card ID was received is also stored in relation to this card ID and box ID.

Therefore, when the surveillance staff member performs patrol surveillance and returns once more to the management room, it is necessary to perform registration, regarding the completion of patrol surveillance, with respect to the management apparatus 10 (S114). More specifically, the surveillance staff member uses input means such as a keyboard (not shown) to make an input to the management apparatus 10 regarding the completion of patrol surveillance. The surveillance staff member then uses the IC card reader/writer 19, with which the management apparatus 10 is equipped, to allow a card ID to be read that is stored in the IC card 70 in his or her possession. The card ID thus read by the IC card reader/writer 19 is temporarily stored by the storage portion 15 of the management apparatus 10.

Figure 13:
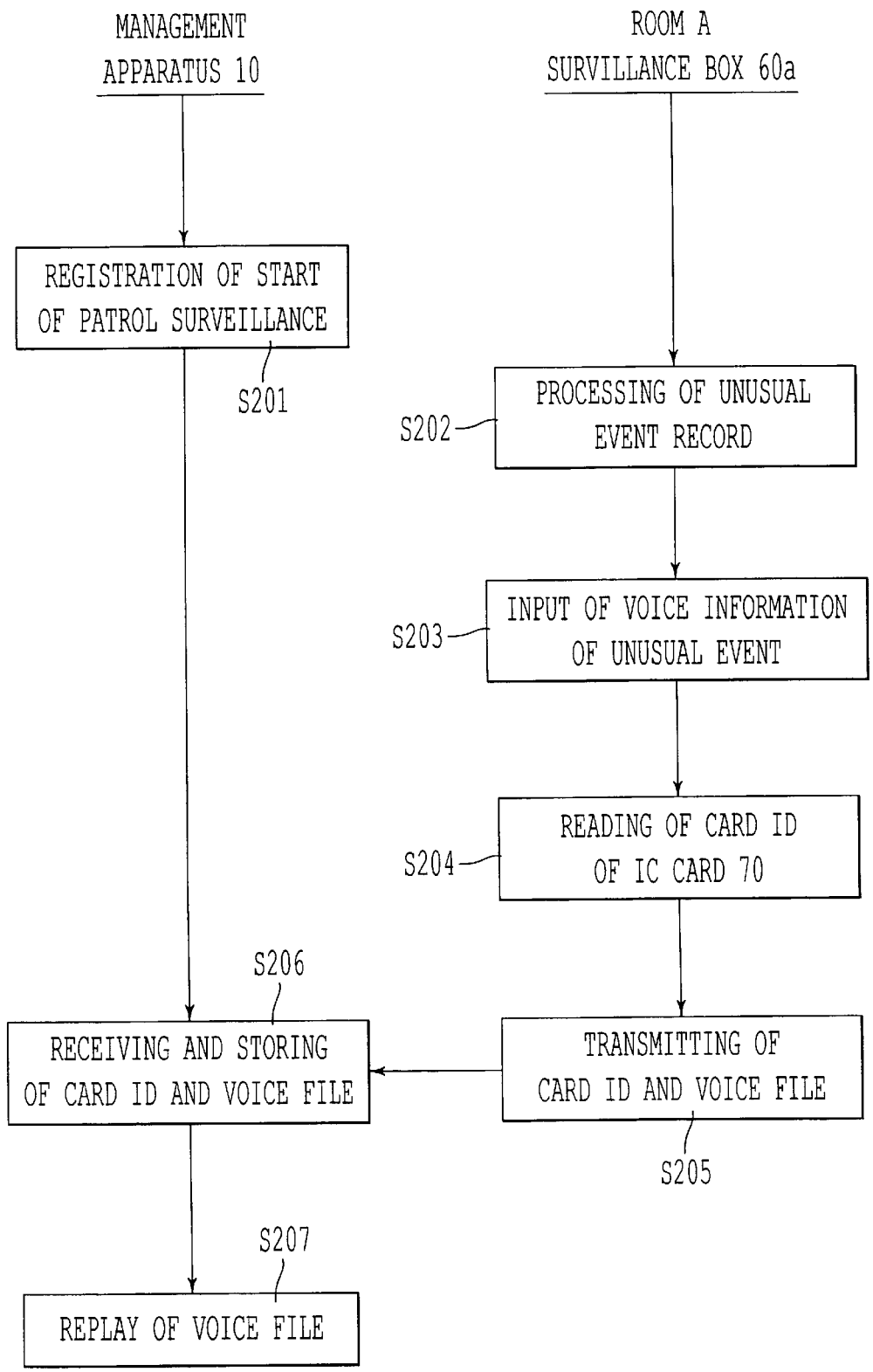
FIG. 13 is a flowchart showing a process of an administrative system according to the present invention.

Next, a case will be described, using FIG. 13, in which a surveillance staff member discovers an unusual event in the course of patrol surveillance and registers this unusual event using his or her voice.

First of all, a surveillance staff member performs registration with regard to the start of patrol surveillance (S201). With regard to the concrete processing of this registration, a description thereof is omitted here since this processing is like the processing described using step S101 of FIG. 12.

The surveillance staff member then discovers an unusual event in the A room in the course of patrol surveillance. In such a case, the surveillance staff member presses an unusual event record button, with which the surveillance box 60*a* is equipped. In accordance with this depression of the unusual event record button, the surveillance box 60*a* performs prescribed processing (S202). For example, the surveillance box 60*a* begins a voice recording by means of a voice input device 67. The surveillance staff member faces the voice input device 67 to report information with regard to the nature of the unusual event which has been discovered, and this unusual event information is thus recorded as voice information (S203). Thereafter, the surveillance staff member inserts his or her own IC card 70 into the card reader 66 of the surveillance box 60*a*. The surveillance box 60*a* then reads the card ID from the IC card 70 (S204), and, in accordance with the reading of the card ID, the surveillance box 60*a* suspends the processing for recording by means of a microphone 67. Next, the surveillance box 60*a* transmits the card ID along with a voice file, which is generated by the voice recording, to the management apparatus 10 (S205).

The management apparatus 10 receives the card ID and voice file and stores same in the storage portion 15 (S206). At this time, the management apparatus 10 judges that, on the basis of information on the port receiving the card ID, the source of the transmission of this card ID is the surveillance box 60*a*, and then stores the box ID of the surveillance box 60*a* in relation to this card ID and voice file. In addition, information regarding the time at which the card ID was received is also stored in relation to this card ID, voice file and box ID. Next, the management apparatus 10 is able to replay this voice file in accordance with a request from an operator of the management apparatus 10 (S207).

Second Embodiment of the Invention

The administrative system relating to the second embodiment of the invention has the characteristic feature of writing predetermined information on an IC card 70 carried by the surveillance staff by means of an IC card reader/writer 66 of the surveillance boxes 60 that are provided in the patrol surveillance route.

Figure 14:
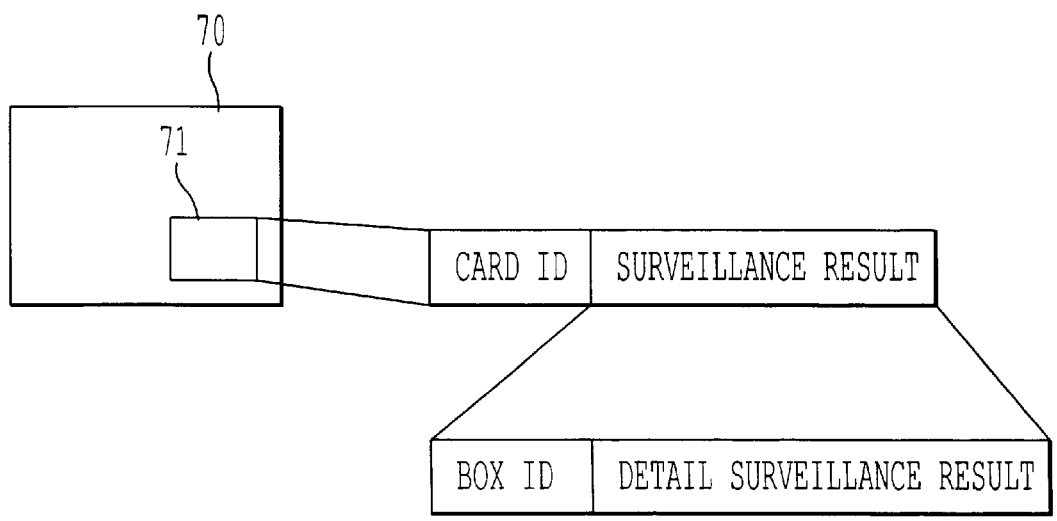
FIG. 14 is a diagram showing a configuration of IC card.

FIG. 14 is a figure to show the configuration of an IC card 70 that is employed in the administrative system relating to the second embodiment of the invention. A storage element is provided in an IC chip 71 which is buried within the body of the IC card 70. Further, at least a card ID and surveillance result information is stored in this storage element. Here, this surveillance result information includes a box ID and information to indicate whether or not an inspection has been completed. In addition, this inspection information may also contain a voice file indicating the nature of an alert inputted by a surveillance staff member.

Figure 15:
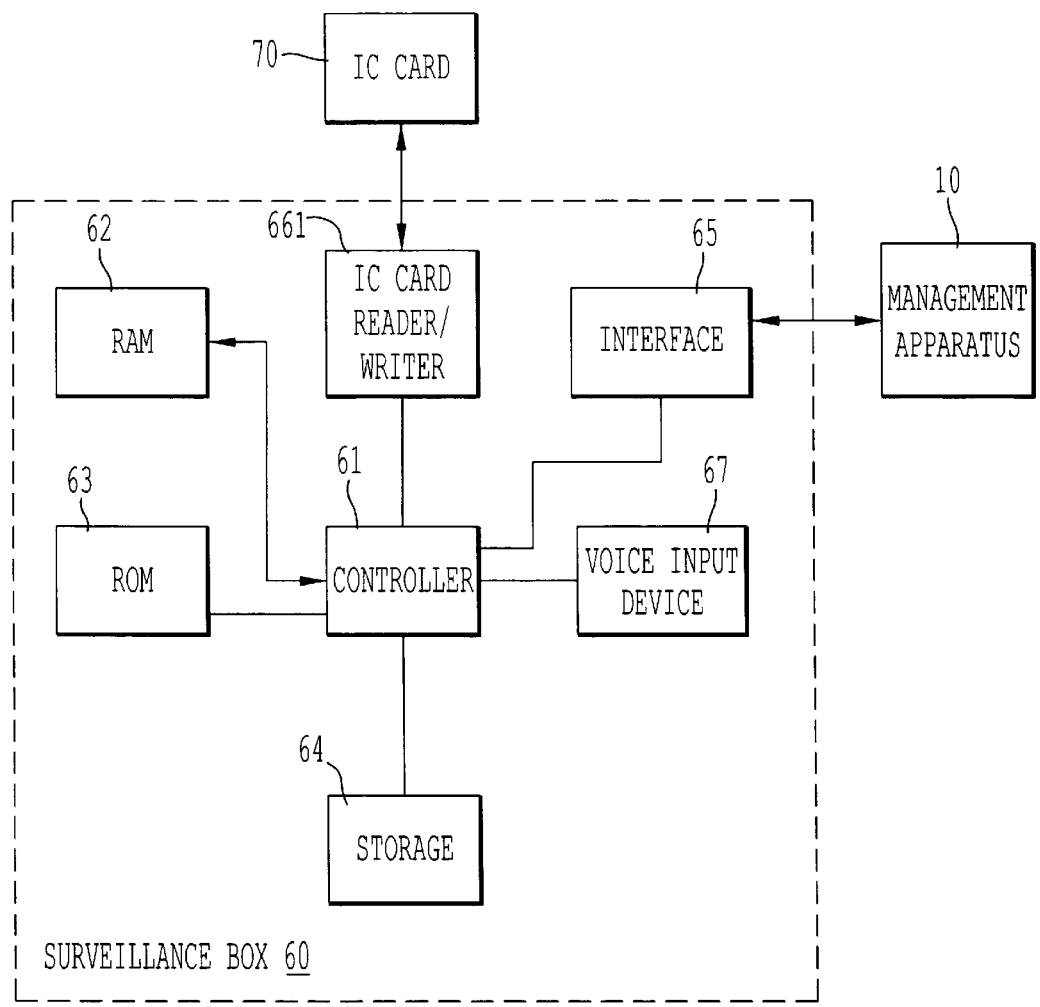
FIG. 15 is a block diagram showing another example of a surveillance box according to the present invention.

FIG. 15 is a figure showing the configuration of the surveillance boxes 60 employed in the administrative system relating to the second embodiment of the invention. As shown in the figure, an IC card reader/writer 661 is provided in the surveillance box 60 in place of an IC card reader. This IC card reader/writer 661 writes information such as inspection information to the IC cards 70.

When a surveillance staff member inserts an IC card 70 into each of the surveillance boxes 60, at least respective box IDs are written to the IC card 70. Then, in a case in which a surveillance staff member inserts an IC card 70 into all of the surveillance boxes 60 on the patrol surveillance route, and then returns to the management room, the surveillance staff member also inserts the IC card 70 into the management apparatus 10. The management apparatus 10 then reads out the card ID and box IDs from the IC card 70 by means of the IC card reader/writer 19, and stores these IDs in a predetermined storage area. By means of a configuration of this kind, it is also possible to manage surveillance movements along a patrol surveillance route.

In the second embodiment, an example is described which employs an IC card reader/writer 661, but the invention is not limited to an IC card reader/writer. Rather, an IC card writer, which has only a function to write information, may also be used.

Third Embodiment of the Invention

In the administrative system relating to the third embodiment of the invention, a surveillance box 60 is provided in the vicinity of the outer side of the doors constituting the entrance/exit openings, and not only do the surveillance boxes 60 serve as processing devices for patrol surveillance, but also the surveillance boxes 60 are furnished with a function to act as IC card reading means for opening and closing the doors. The configuration of the surveillance boxes 60 relating to the third embodiment may also be like the configuration shown in FIG. 10. However, information for making a judgement regarding the cancellation of the door key is stored in the storage portion 64, and the controller 61 is constituted so as to instruct a door key system, under predetermined conditions, via an interface 65, to cancel the door key. Further, in a pre-systemization process, it is necessary to be able to distinguish the card IDs stored in the IC card as: a card ID for the IC card to be used by the surveillance staff, and a card ID to be used for canceling the door key.

Figure 16:
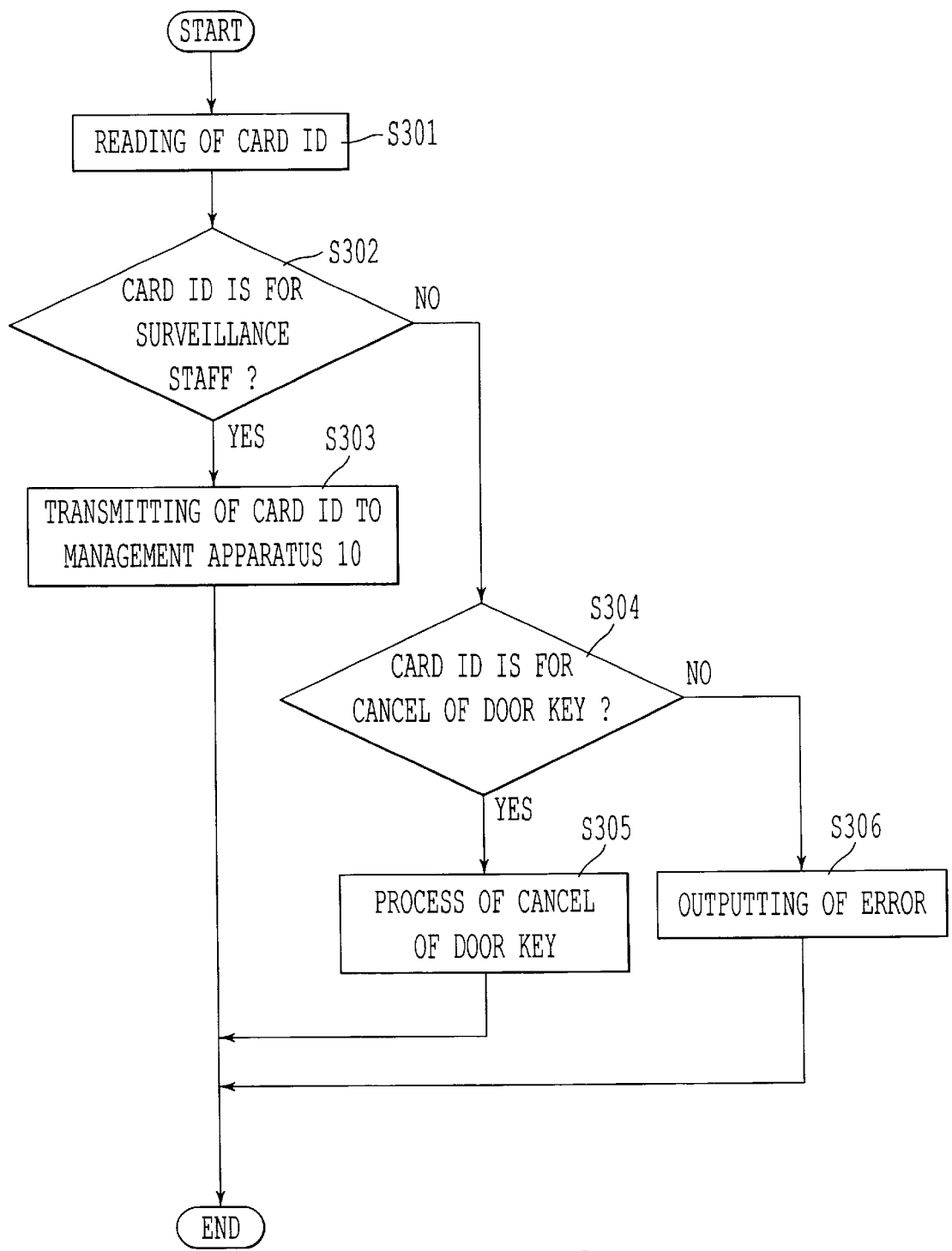
FIG. 16 is a flowchart showing a process of an administrative system according to the present invention.

FIG. 16 is a flow chart to show the processing flow of the administrative system relating to the third embodiment of the present invention.

First, the IC card reader 66 reads the card ID which is stored in an inserted IC card 70 (S301). Then, the controller 61 makes a judgement, on the basis of card ID system information that is stored in the storage portion 64, as to whether or not the card ID thus read is a card ID to be used by surveillance staff (S302).

When the judgement result is such that the card ID thus read is a card ID to be used by surveillance staff, this card ID is transmitted to the management apparatus 10 (S303). Thereafter, processing is like the processing shown in the flow chart of FIG. 12.

Conversely, when the judgement result is such that the card ID thus read is not a card ID to be used by surveillance staff, a further judgement is made as to whether or not the card ID matches an ID to be used to cancel the door key (S304). When the judgement result indicates a match, processing is performed to cancel the door key (S305). Also, when it is judged that no such match exists, an error output is made (S306). For example, the error is indicated on a display with which the surveillance boxes 60 are equipped.

By means of a configuration of this kind, since an administrative system device and a door key system device are integrally combined, there is no requirement to install a plurality of devices in each room. Moreover, since the IC card reader component can be shared, miniaturization of the device is possible as well as a low price thereof.

Further Embodiment

In addition, this IC card, which stores identification information, may also be a memory card, or an information storage medium, of a mobile telephone for example, that is capable of storing another kind of information. The exchange of this information need not be performed by bringing direct terminals into contact with one another. Information exchange may also be carried out through conversion of electromagnetic wave signals. For example, short distance communications called "Bluetooth" may also be utilized. It is also possible to utilize a contact-free IC card system. In such a case, since a surveillance staff member is not required to repeatedly insert an IC card into the IC card readers, it is possible to carry out surveillance activities efficiently.

In addition, the information storage medium need not store information electronically; instead, it is also possible to convert the information itself into bar codes to be printed. Further, the information itself may be printed as-is as characters and symbols to be read using character recognition means such as OCR software.

Further, as per the examples described above, one surveillance box is provided in each room. However, the invention is not limited to the provision of one surveillance box per room. In other words, there may also be rooms with no surveillance box whatever or, indeed, a plurality of surveillance boxes may also be provided for one room.

In a case in which an unusual event is discovered by surveillance staff, as per the above examples, the surveillance staff make a voice input. However, the invention is not limited to an input of this kind, it being equally possible to input images.

According to the present invention, it is possible to provide an administrative system, and devices associated therewith, which make it possible to manage whether or not surveillance staff have been to predetermined positions on a patrol surveillance route, and to thereby raise the property value of buildings by enhancing the system whereby such buildings are managed.

While preferred embodiments of the invention have been described using specific terms, such description is for illustrative purposes only, and it is to be understood that changes and variations may be made without departing from the spirit or scope of the following claims.

What is claimed is:

1. An administrative system for managing surveillance by surveillance staff carrying out patrol surveillance, comprising:

surveillance means, provided in a plurality of locations on a patrol surveillance route, for reading first identification information stored in an information storage medium carried by said surveillance staff, and for transmitting the first identification information; and management means for receiving, at respective dedicated ports, the first identification information transmitted by said surveillance means and for storing the first identification information in relation to second identification information that identifies the surveillance means, wherein the second identification information, which includes information of at least one of the plurality of locations, is automatically detected by the management means based on a port of the respective dedicated ports that receives the first identification information, without being transmitted by the surveillance means.

2. The administrative system according to claim 1, wherein said surveillance means includes network devices comprising a network.

3. The administrative system of claim 2, wherein said surveillance means comprises:
    voice input means for making voice inputs; and
    voice information transmission means for transmitting voice information, which is input by the voice input means, to said management means,
    wherein said management means receives the voice information, and stores the voice information in relation to said first identification information and said second identification information.

4. The administrative system of claim 2, wherein said surveillance means further:
    alert input means for inputting an alert; and
    alert information transmission means for transmitting alert information, which is input by the alert input means, to said management means,
    wherein said management means further comprises:
    alert output means for receiving the alert information and making an external output.

5. The administrative system of claim 2, wherein said surveillance means comprises a key system for opening and closing a predetermined door.

6. The administrative system of claim 2, wherein said first identification information is one of a Media Access Control (MAC) address and an Internet Protocol (IP) address.

7. The administrative system according to claim 1, wherein said surveillance means includes interconnecting devices that relay information on a network.

8. The administrative system of claim 7, wherein said surveillance means comprises:
    voice input means for making voice inputs; and
    voice information transmission means for transmitting voice information, which is input by the voice input means, to said management means,
    wherein said management means receives the voice information, and stores the voice information in relation to said first identification information and said second identification information.

9. The administrative system of claim 7, wherein said surveillance means further:
    alert input means for inputting an alert; and
    alert information transmission means for transmitting alert information, which is input by the alert input means, to said management means,
    wherein said management means further comprises:
    alert output means for receiving the alert information and making an external output.

10. The administrative system of claim 9, wherein said surveillance means comprises a key system for opening and closing a predetermined door.

11. The administrative system of claim 7, wherein said first identification information is one of a Media Access Control (MAC) address and an Internet Protocol (IP) address.

12. The administrative system according to claim 1, wherein said surveillance means comprises:
    voice input means for making voice inputs; and
    voice information transmission means for transmitting voice information, which is input by the voice input means, to said management means,
    wherein said management means receives the voice information, and stores the voice information in relation to said first identification information and said second identification information.

13. The administrative system according to claim 1, wherein said surveillance means further comprises:
    alert input means for inputting an alert; and
    alert information transmission means for transmitting alert information, which is input by the alert input means, to said management means,
    wherein said management means further comprises:
    alert output means for receiving the alert information and making an external output.

14. The administrative system according to claim 1, wherein said surveillance means comprises a key system for opening and closing a predetermined door.

15. The administrative system according to claim 1, wherein said first identification information is one of a Media Access Control (MAC) address and an Internet Protocol (IP) address.

16. A management apparatus for managing surveillance by surveillance staff carrying out patrol surveillance, comprising:
    identification information reception means for receiving, at respective dedicated ports, first identification information that is (1) read using surveillance means provided in a plurality of locations on a patrol surveillance route, and (2) stored in an information storage medium carried by said surveillance staff and
    management means for storing the first identification information received using said identification information reception means, in relation to second identification information that identifies the surveillance means,
    wherein the second identification information, which includes information of at least one of the plurality of locations, is automatically detected by the management means based on a port of the respective dedicated ports that receives the first identification information, without being received by the identification information reception means.

17. The management system according to claim 16, further comprising alert output means for receiving alert information transmitted by the surveillance means and for making an external output.

18. The management system according to claim 16, wherein said first identification information is one of a Media Access Control (MAC) address and an Internet Protocol (IP) address.

19. A surveillance method for managing surveillance by surveillance staff carrying out patrol surveillance, comprising:
    reading, in a plurality of locations on a patrol surveillance route, first identification information stored in an information storage medium carried by said surveillance staff;
    transmitting said first identification information;
    receiving said first identification information at respective dedicated ports; and
    storing said first identification information in relation to second identification information,
    wherein the second identification information identifies a position on the patrol surveillance route, and the second identification information is automatically detected, based on a port of the respective dedicated ports that receives the first identification information, without being transmitted.

20. An administrative system for managing surveillance by surveillance staff carrying out patrol surveillance, comprising:

surveillance means, provided in a plurality of locations on a patrol surveillance route, for reading by reading means first identification information stored in an information storage medium carried by said surveillance staff and identification information for canceling a door key, for transmitting the first identification information when information read by the reading means is the first identification information, and for performing processing for canceling a door key when information read by the reading means is the identification information for canceling a door key; and management means for receiving, at respective dedicated ports the first identification information transmitted by said surveillance means and for storing the first identification information, which includes information of at least one of the plurality of locations, in relation to second identification information that identifies the surveillance means, wherein the second identification information is automatically detected by the management means based on a port of the respective dedicated Ports that receives the first identification information.

* * * * *